(12) United States Patent
Fuleshwar Prasad et al.

(10) Patent No.: US 10,448,327 B2
(45) Date of Patent: Oct. 15, 2019

(54) DYNAMIC POWER MANAGEMENT OF IOT DEVICES

(71) Applicant: BlackBerry Limited, Waterloo (CA)

(72) Inventors: Mahendra Fuleshwar Prasad, Waterloo (CA); Jonathan Quinn Brubacher, Waterloo (CA); Scott Leonard Dill, Waterloo (CA); Jason Wayne Jantzi, St. Clements (CA); Alexander John Ogle, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/468,974

(22) Filed: Mar. 24, 2017

(65) Prior Publication Data

US 2018/0279221 A1 Sep. 27, 2018

(51) Int. Cl.
*H04W 52/02* (2009.01)
*H04L 29/08* (2006.01)

(52) U.S. Cl.
CPC ... *H04W 52/0216* (2013.01); *H04W 52/0254* (2013.01); *H04W 52/0277* (2013.01); *H04L 67/125* (2013.01); *H04W 52/0235* (2013.01); *H04W 52/0261* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/164* (2018.01); *Y02D 70/26* (2018.01)

(58) Field of Classification Search
None
See application file for complete search history.

(56) References Cited

U.S. PATENT DOCUMENTS

| 9,445,372 B1* | 9/2016 | Lee ............... H04W 52/028 |
| 2009/0257369 A1* | 10/2009 | Igarashi ........... H04W 52/0261 370/311 |
| 2010/0313050 A1 | 12/2010 | Harrat et al. |
| 2012/0155349 A1* | 6/2012 | Bajic ................ H04W 4/008 370/311 |
| 2012/0210150 A1 | 8/2012 | De Lind Van et al. |
| 2015/0276881 A1 | 10/2015 | Liu et al. |
| 2015/0312868 A1* | 10/2015 | Li ..................... H04W 56/001 370/311 |
| 2016/0054789 A1 | 2/2016 | Yang |
| 2017/0142048 A1* | 5/2017 | Tyagi ................... H04L 51/12 |

OTHER PUBLICATIONS

International First Notice Informing the Applicant of the Communication of the International Application (To Designated Offices Which Do Not Apply the 30 Month Time Limit Under Article 22(1)) issued in International Application No. PCT/CA2018/050333 on Oct. 25, 2018, 1 page.
International Search Report and Written Opinion issued in International Application No. PCT/CA2018/050333 dated Jun. 7, 2018, 11 pages.

* cited by examiner

*Primary Examiner* — Candal Elpenord
(74) *Attorney, Agent, or Firm* — Fish & Richardson P.C.

(57) ABSTRACT

A method for dynamic power management of electronic devices includes determining, at a server, a remaining battery life of an electronic device, wherein the electronic device is powered by a battery and associated with a power management profile for managing power consumption at the electronic device; and based on the determined remaining battery life, provisioning an updated power management profile for the electronic device.

16 Claims, 2 Drawing Sheets

DYNAMIC POWER MANAGEMENT OF IOT DEVICES

TECHNICAL FIELD

This disclosure relates to power management in wireless communication systems and, more specifically, to dynamic power management of Internet of Thing (IoT) devices.

BACKGROUND

Internet of Things (IoT) devices are typically low-cost, battery operated (non-rechargeable or rechargeable batteries) with limited processing capabilities and low power consumption, and have no display or user interface. It is desirable to know the remaining battery life of an IoT device and extend the battery life. Due to limited processing power available on IoT devices and low power consumption requirements for IoT devices, it is challenging for the device itself to estimate the remaining battery life and implement efficient power management.

DESCRIPTION OF DRAWINGS

Like reference numbers and designations in the various drawings indicate like elements.

DETAILED DESCRIPTION

The present disclosure is directed to dynamic power management of Internet of Thing (IoT) devices. In wireless communication systems, an IoT device is usually battery operated (a non-rechargeable or rechargeable battery or battery pack), and it is desired to estimate the remaining battery life to manage power consumption at the device and extend the battery life.

At a high level, the described approach enables a server in a network to estimate a remaining battery life of an IoT device based on a small amount of information from the device. In some implementations, the server can also determine if the battery is at its end of life. The server can store battery usage profiles to facilitate remaining battery life estimation. Based on the remaining battery life, the server can send different power management profiles to the device to manage power consumption at the device. For instance, if a temperature condition and/or a current power usage of the device puts the device on a trend of either brownout or not meeting a target battery life, the server can send a power management profile to change the behaviour of the device to extend the battery life. For example, the server can instruct the device to wake up less often to communication with the server, and/or disable some functionalities on the device.

Figure 1:
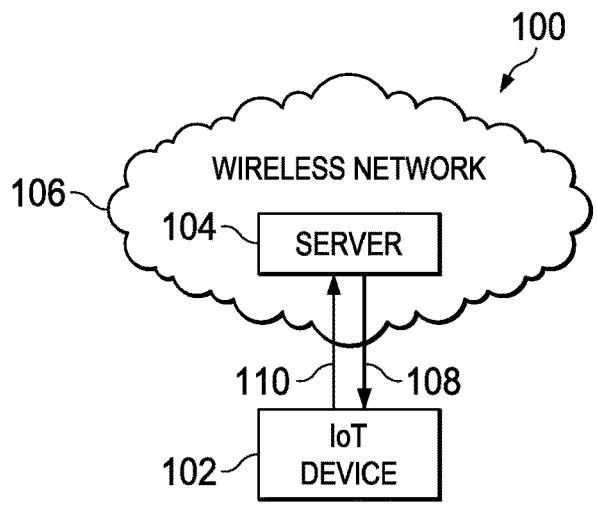
FIG. 1 is an example wireless communication system that includes dynamic power management of Internet of Things (IoT) devices according to some implementations.

FIG. 1 is an example wireless communication system 100 that includes dynamic power management of IoT devices according to some implementations. In some implementations, a server can determine a remaining battery life of an IoT device, where the IoT device is powered by a battery and associated with a power management profile for managing power consumption at the IoT device. Based on the determined remaining battery life, the server can provision an updated power management profile for the IoT device. The battery is at least one of a rechargeable battery or a non-rechargeable battery. The power management profile can include at least one of: a wake-up frequency for a radio component of the IoT device to communicate with the server, and a time duration of each radio component wake-up; a wake-up frequency for a navigation component of the IoT device to gather navigation data, and a time duration of each navigation wake-up; a frequency for polling measurements from one or more sensors of the IoT device; or instructions to disable at least one application or one functionality on the IoT device. Based on the received power management profile, the IoT device can perform at least one of: scaling a voltage, a frequency, or a sleep duration of a processor of the IoT device, queuing sensor events, information store-and-forward, scaling a periodicity of event reporting, or turning off unused functions. The power management profile can be transmitted from the server to the IoT device. The server can store a plurality of power management profiles, where the power management profile and the updated power management profile are from the plurality of power management profiles stored at the server.

In some implementations, the server can receive from the IoT device information for determining the remaining battery life including at least one of an unloaded battery voltage, a loaded battery voltage at a particular current value, or a temperature at the IoT device. The server can store a battery usage profile of the IoT device, the battery usage profile including information of at least one of battery capacity, battery temperature derating, or battery equivalent series resistance (ESR) profile. The server can determine the remaining battery life based on at least one of the received information from the IoT device, the battery usage profile, or the power management profile. The server can also determine if the battery is at end of life by determining an ESR of the battery. In some cases, the server can receive navigation data from the IoT device. Based on the navigation data, the server can determine if the IoT device is stationary or moving. Based on the determining, the server can transmit a further updated power management profile to the IoT device. In some implementations, a sensor (e.g., an accelerometer or a gyro) on the IoT device can determine whether the device is moving or stationary and send the information to the server, and the server can transmit a corresponding power management profile.

The dynamic power management of IoT devices according to methods and systems described herein enables a device to offload remaining battery life estimation to a server to reduce battery usage at the device. The server can push power management profiles to the device to dynamically and efficiently manage and adjust power consumption at the device to meet a target battery life.

The example communication system 100 includes an IoT device 102 and a wireless network 106 including a server 104. The device 102 communicates with the wireless network 106 through a wireless connection. In some cases, the server 104 can be in a base station in the wireless network 106, and the device 102 can directly connect to the server 104 via a wireless link. In some cases, the server 104 is in a network node different than a base station, and the device 102 can connect to the server 104 through a base station, where the device 102 connects to the base station via a wireless link and the base station connects to the server 104 via a wired link. In some implementations, the wireless network 106 can include a cloud computing environment, and the server 104 can be in the cloud computing environment. The device 102 can send information 110 to the server 104 for remaining battery life estimation, and the server 104 can send a power management profile 108 to the device 102.

The device 102 can be powered by a non-rechargeable or rechargeable battery or battery pack. In some implementations, the server 104 can estimate a remaining battery life by estimating a time duration the battery can last under a current power usage (e.g., device wake-up frequencies specified in the current power management profile). In some implementations, the server 104 can estimate a remaining battery life by estimating an amount of remaining battery energy (e.g., in a unit of Watt-hour). For a non-rechargeable battery, remaining battery energy is the battery energy remained in the battery. For a rechargeable battery, since the battery can have a number of charge/discharge cycles before the battery fails to operate, the remaining battery energy can include the remaining energy in the current cycle as well as potential energy of unused cycles. A battery can have an internal electrical resistance, called equivalent series resistance (ESR). For some batteries, ESR increases as the battery ages and is an indicator of the remaining battery life. For instance, a battery can be close to its end of life (e.g., end of charge/discharge cycles or the battery capacity is depleted) if the ESR is higher than a threshold.

The device 102 can include a number of sensors, for example, sensors to measure a temperature, a pressure, a humidity at the device 102, a GPS to measure a location of the device 102, or other sensors. The device 102 can also have a radio component to communicate with the server 104. The radio component can be a transmitter, a receiver, or both. Based on the power management profile 108 from the server 104, the device 102 can periodically turn on the sensors to collect measurements, and periodically turn on the radio component to transmit the collected measurements to the server 104 and receive any updated power management profile from the server 104. For example, if the remaining battery life is lower than a threshold, the device 102 can turn on the sensors and radio component less frequently.

For helping the server 104 to estimate the remaining battery life, a small amount of data is transmitted from the device 102 to the server 104. Transmitting a small amount of data also enables the device 102 to reduce power consumption as the radio component can be turned on for a short period time, instead of a long period of time, for transmitting data. The device 102 can measure an unloaded battery voltage, a loaded battery voltage at a particular current value, and a temperature of the device 102, and send these measurements to the server 104. As will be discussed below, the server 104 can estimate a battery ESR based on the unloaded and loaded voltages, the particular current value, and the temperature of the device 102.

The power management profile 108 from the server 104 can have application specific information. For example, the power management profile 108 can specify how frequent a processing unit of the device 102 should wake up, a time duration of each wake-up for the processing unit, how frequent the radio component should wake up to transmit and receive data, a time duration of each wake-up for the radio component (i.e., on duration), how often an application should wake up, and a time duration of each wake-up for the application, how often navigation data should be gathered, how often sensors should be polled or wake up to perform measurements, and how many sensors are to be monitored, etc. In some implementation, the power management profile 108 can also instruct the device 102 to disable some applications or functionalities on the device 102 when the remaining battery life is below a threshold. The device 102 can adjust its operations according to the parameters specified in the power management profile 108. For example, the device 102 can scale a voltage or a frequency of the processing unit, change on/off durations of applications, change sleep durations of the processing unit or the radio component, queue sensor events, implement information store-and-forward, scale periodicities of events reporting, or turn off functions that are not used. Based on the estimated remaining battery life, the server 104 can send an updated power management profile to the device 102. For instance, if the remaining battery life is below a threshold, the server 104 can instruct the device 102 to wake up the radio component less often and reduce the time duration for each wake-up (e.g., reduce the "on" duration from 10 seconds to 1 second).

In some cases, different power management profiles can be used for stationary and non-stationary devices to manage power consumption. Based on the reported GPS locations from the device 102, the server 104 can determine whether the device is stationary or moving. If a stationary device becomes a moving device or vice versa, the server 104 can send a corresponding power management profile to the device 102. In some implementations, a sensor (e.g., an accelerometer or a gyro) on the device 102 can determine whether the device 102 is moving or stationary and send the information to the server 104, and the server 104 can send a corresponding power management profile to the device 102.

A moving device can communicate with the server 104 more frequently than a stationary device. For instance, when the device 102 is moving, the server 104 can instruct the device 102 to take GPS fixes every 5 minutes, queue sensor events for 15 minutes, and transmit data (e.g., sensor data and GPS locations) to the server 104 every 15 minutes. When the device 102 is stationary, the server 104 can instruct the device 102 to take GPS fixes every 3 hours and transmit data to the server 104 every 24 hours. However, if some critical sensor events occur, the stationary device 102 will queue the events for 15 minutes and send data to the server 104 after 15 minutes instead of waiting for 24 hours. For example, a critical sensor event can be a sensor detecting that a temperature at the device is below or above a threshold for a certain period of time. Because a battery life varies with temperatures, the device 102 will report such temperature events to the server 104 after 15 minutes, instead of 24 hours, so that the server 104 can have a better estimation of remaining battery life.

The server 104 can estimate the power consumption at the device 102 based on the power management profile. For example, based on a GPS location reported by the device 102 and a distance between the device 102 and its associated base station, the server 104 can estimate a transmit power for the device 102 to reach its associated base station (e.g., a higher transmit power is needed if the device is far away from its associated base station). Based on the estimated transmit power, together with the radio wake-up frequency and the on duration of each wake-up specified in the power configured profile, the server 104 can estimate an amount of battery energy consumed during a period of time.

The server 104 can store a battery usage profile including information such as battery capacity, battery temperature derating, characterized battery life estimation, or battery ESR profile. The battery capacity can indicate an amount of total energy the battery can store. The battery ESR profile can include ESR information at different current values, temperatures, on durations of the radio component, and/or loaded and unloaded battery voltages. For example, at a current of 250 mA and one-second on duration of the radio component, the battery ESR profile can characterize ESRs at different temperatures (e.g., 25° C., 60° C., 0° C., −20° C.) and/or different loaded and unloaded battery voltages. ESR typically varies with temperature and battery voltage. A high ESR and a low measured battery voltage indicate that the battery is nearing its end of life. As discussed above, the device 102 can send the measured unloaded voltage, loaded voltage at a particular current, and temperature to the serve 104. As the server 104 knows the on duration of the radio component (because the server configures the on duration through the power management profile), based on the battery ESR profile and the measurements from the device 102, the server 104 can estimate the ESR and determine if the battery is close to its end of life. For example, the battery is close to its end of life if the ESR is higher than a threshold. In some cases, the battery is close to its end of life if the remaining battery energy is below a predetermined percentage (e.g., 1%) of the battery capacity. Alternatively, or in addition, the battery end of life can be determined based on coulomb counting or a combination of factors such as a voltage droop during a current burst, and/or a rest state voltage, adjusted for the device temperature and/or the power management profile.

The battery usage profile can also include battery chemistry specific model data so that the server 104 can better estimate the remaining battery life based on the power management profile and environmental factors such as the device temperature and a time the battery in the field (battery aging). For example, the available energy could be adjusted for leakage current losses as a factor of temperature and/or time in the field (aging), and the usable energy or power could be adjusted as a factor of temperature, load current and time, and time in the field (aging).

In some cases, the server 104 can store battery usage profiles for different battery types, models, manufacturers. When the device 102 connects to the wireless network 106 (e.g., during an initial registration), the device 102 can send its battery information, such as the battery type, model, and manufacturer, to the server 104 so that the server 104 can use a corresponding battery usage profile.

Following are three example use cases for the described approach.

EXAMPLE 1

An IoT device is operating in a condition where periodically the temperatures drop to −40° C., which diminishes the power rating of the battery compared to warm temperatures. When the server detects that the device is in such an extreme cold environment, the server issues commands to slow down the frequency of radio communications, or device wakeups and prevent the device from shutting down due to brownout.

EXAMPLE 2

An IoT device is operating in an environment of high temperatures, where the internal leakage current of the battery significantly diminishes the battery energy available over time. By using battery specific models in the battery usage profile stored at the server and based on the measured temperature, the server can adjust the usable energy to account for leakage current over time.

EXAMPLE 3

A manufacturer promises customers a 5-year battery life for manufactured devices. In the field, each device may have different power consumption over a time period due to, e.g., different radio wakeup frequencies and durations and temperature exposures, and different available energy due to the environmental factors affecting the battery. The server can take these factors into account, and control the performance of any given device such that all devices not only meet but their performance is optimized for the expected 5-year battery life. For example, if the remaining battery life is lower than a threshold at the end of the first year, the server may instruct the device to wake up less often to save power so that the device can meet the 5-year expected battery life.

Turning to a general description of the elements, an IoT device 102 may be referred to but is not limited to as a wireless sensor, wireless meter, user equipment, electronic device, mobile electronic device, user device, mobile station, subscriber station, portable electronic device, mobile communications device, wireless modem, or wireless terminal. Examples of an IoT device may include but are not limited to a smart meter, smart sensor, cellular phone, personal data assistant (PDA), smart phone, laptop, tablet personal computer (PC), pager, portable computer, portable gaming device, wearable electronic device, test equipment, gambling machine, car/vehicle, notice board, home appliance, or other mobile communications device having components for communicating data via a wireless communication network. The wireless communication network may include a wireless link over at least one of a licensed spectrum and an unlicensed spectrum.

Other examples of an IoT device include mobile and fixed electronic devices. An IoT device may include a Mobile Equipment (ME) device and a removable memory module, such as a Universal Integrated Circuit Card (UICC) that includes a subscriber identity module (SIM), a Universal SIM (USIM), or a Removable User Identity Module (R-UIM). The term "IoT device" can also refer to any hardware or software component that can terminate a communication session with a wireless network.

The wireless communication network 106 may include one or a plurality of radio access networks (RANs), other access networks such as fixed Ethernet or IEEE 802.11 WLAN, core networks (CNs), and external networks. The RANs may include one or more radio access technologies. In some implementations, the radio access technologies may be but are not limited to Global System for Mobile communication (GSM), Interim Standard 95 (IS-95), Universal Mobile Telecommunications System (UMTS), CDMA2000 (Code Division Multiple Access), Evolved UMTS, Long Term Evolution (LTE), or LTE-Advanced (LTE-A). In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a device to communicate. The base station or plurality of base stations may constitute the cellular network to provide a wide area of coverage. The base station directly communicates with one or a plurality of devices, other base stations, and one or more core network nodes.

Figure 2:
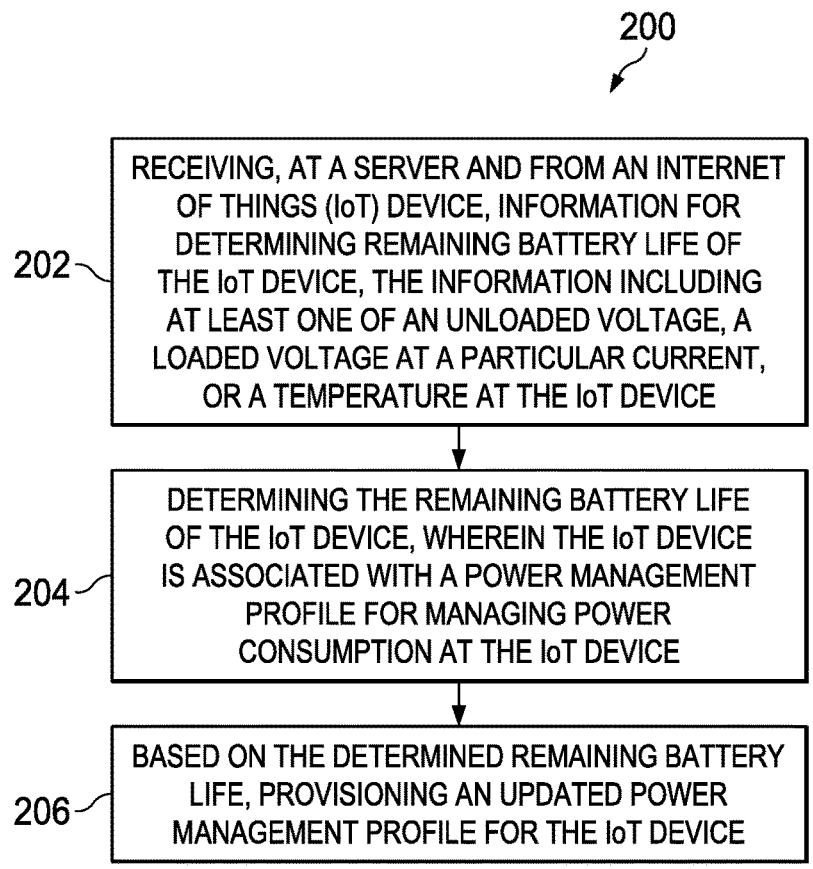
FIG. 2 is a flowchart illustrating an example method for dynamic power management of IoT according to some implementations.
Figure 3:
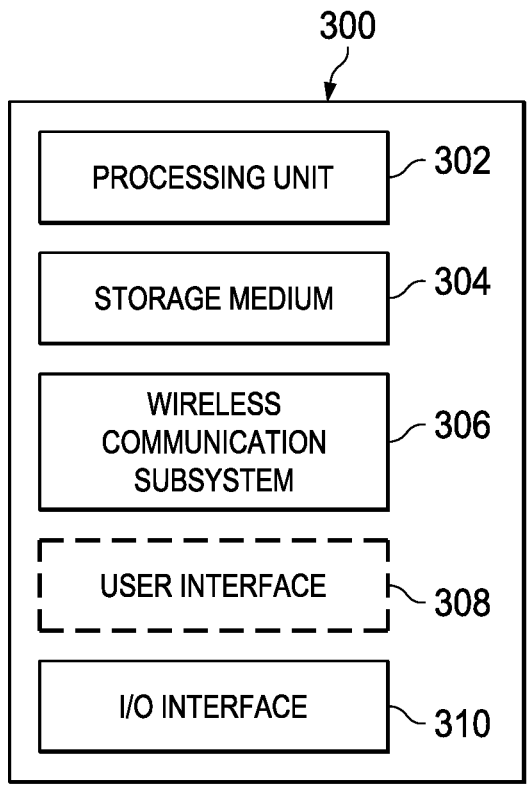
FIG. 3 is a schematic illustrating an example IoT device according to some implementations.
Figure 4:
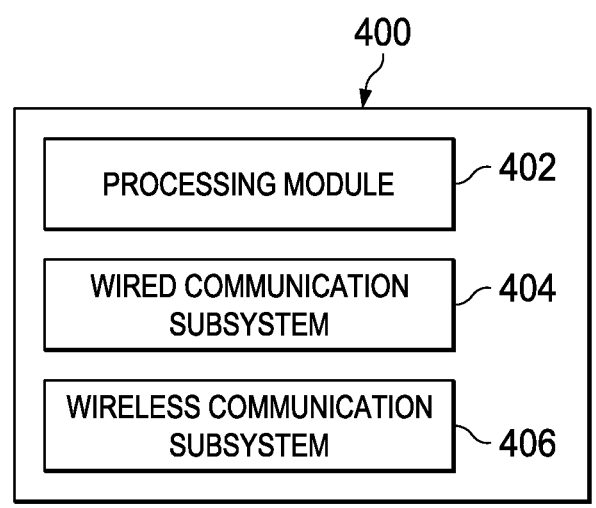
FIG. 4 is a schematic illustrating an example network node according to some implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. FIGS. 2-4 and associated descriptions provide additional details for these implementations.

FIG. 2 is a flowchart illustrating an example method 200 for dynamic power management of IoT according to some implementations. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

The method 200 starts at block 202, where a server receives from an IoT device information for determining a remaining battery life. The received information can include at least one of an unloaded battery voltage, a loaded battery voltage at a particular current value, or a temperature at the IoT device. The IoT device can currently operate based on a power configuration file received from the server. As discussed above, the power management profile configures operational parameters at the device and manages power consumption at the device. The power management profile can include information such as how often the radio component is to wake up and a time duration of each wake-up. In some cases, the device can also send information to the server indicating the power management profile the device is currently using.

At block 204, the server determines the remaining battery life of the IoT device. As discussed above, based on the information from the device (e.g., temperature, unloaded battery voltage, loaded battery voltage and the associated current value) and the battery usage profile stored at the server, the server can estimate ESR to determine if the battery is close to the end of life. Based on the power management profile, the server can also estimate power consumption at the device. For example, based on the radio wake-up frequency, the time duration of each wake-up, and the transmit power at the device, the server can estimate an amount of battery energy that has been used and determine the remaining battery energy.

At block 206, based on the determined remaining battery life, the server can provision an updated power management profile for the device. In some implementations, provisioning a power management profile can include, but not limited to, one or more of generating the profile, identifying the profile, transmitting the profile to the device, setting up the profile for a later transmission to the device, etc. For example, if the remaining battery life is below a threshold, the server can send a new power management profile to the device instructing the device to wake up the radio component less often and/or reduce the time duration of each wake-up. In some cases, if the device is operating in an environment that the temperature is below or above a threshold, the server can also send a new power management profile to manage power consumption at the device. In some cases, the server can send a new power management profile to the device if a stationary device becomes a moving device or vice versa. In some implementations, the server can store a set of predetermined power management profiles, and select one of the predetermined power management profile to send to the device.

When transmitting, or sending new profiles to the device, such operations may not be immediate or from the server directly. The foregoing steps may include, in whole or in part, asynchronous communications to/from the device/server. For example, rather than respond with a new profile, the server may provision or indicate a new profile for storage on a content delivery network (CDN) to await download by the device at a later time. Alternatively, the server may configure a new profile for download by the next activity update by the device. The new profile may be sent directly from the server, other infrastructure, or the CDN.

FIG. 3 is a schematic illustrating an example IoT device 300 according to some implementations. The example IoT device 300 includes a processing unit 302, a computer-readable storage medium 304 (for example, ROM or flash memory), a wireless communication subsystem 306, an optional user interface 308, and an I/O interface 310. The processing unit 302 can include one or more processing components (alternatively referred to as "processors" or "central processing units" (CPUs)) configured to execute instructions related to one or more of the processes, steps, or actions described above in connection with one or more of the implementations disclosed herein. The processing unit 302 can also include other auxiliary components, such as random access memory (RAM) and read only memory (ROM). The computer-readable storage medium 304 can be embodied by a non-transitory medium configured to store an operating system (OS) of the device 300 and various other computer-executable software programs for performing one or more of the processes, steps, or actions described above.

The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple input multiple output (MIMO) transmissions. In some implementations, the receivers in the wireless communication subsystems 306 can be an advance receiver or a baseline receiver. Two receivers can be implemented with identical, similar, or different receiver processing algorithms.

The optional user interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example IoT device 300.

FIG. 4 is a schematic illustrating an example network node 400 according to some implementations. The server 104 can be a network node 400. The illustrated device 400 includes a processing module 402, a wired communication subsystem 404, and a wireless communication subsystem 406. The wireless communication subsystem 406 can transmit and receive data traffic and control traffic to and from the IoT devices. In some implementations, the wireless communication subsystem 406 may include a receiver and a transmitter. The wired communication subsystem 404 can be configured to transmit and receive control information between other access node devices via backhaul connections. The processing module 402 can include one or more processing components (alternatively referred to as "processors" or "central processing units" (CPUs)) capable of executing instructions related to one or more of the processes, steps, or actions described above in connection with one or more of the implementations disclosed herein. The processing module 402 can also include other auxiliary components, such as random access memory (RAM), read only memory (ROM), secondary storage (for example, a hard disk drive, flash memory or other non-transitory storage medium). The processing module 402 can execute certain instructions and commands to provide wireless or wired communication, using the wired communication subsystem 404 or a wireless communication subsystem 406. Various other components can also be included in the network node 400.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims. When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method, comprising:
receiving, at a server and from an electronic device, information for determining remaining battery life, wherein the information for determining remaining battery life comprises at least one of an unloaded battery voltage, a loaded battery voltage at a particular electric current value, or a temperature at the electronic device;
determining, by the server and based on at least one of the unloaded battery voltage, the loaded battery voltage at the particular electric current value, or the temperature at the electronic device, a remaining battery life of the electronic device, wherein the electronic device is powered by a battery and associated with a power management profile for managing power consumption at the electronic device, and the power management profile comprises a frequency for polling measurements from one or more sensors of the electronic device; and
based on the determined remaining battery life, provisioning, at the server, an updated power management profile for the electronic device, wherein the updated power management profile is transmitted from the server to the electronic device.

2. The method of claim 1, wherein the power management profile includes at least one of:
a wake-up frequency for a radio component of the electronic device to communicate with the server, and a time duration of each radio component wake-up;
a wake-up frequency for a navigation component of the electronic device to gather navigation data, and a time duration of each navigation wake-up;
or instructions to disable at least one application or one function on the electronic device;

wherein the electronic device, based on the power management profile, performs at least one of: scaling a voltage, a frequency, or a sleep duration of a processor of the electronic device, queuing sensor events, information store-and-forward, scaling a periodicity of event reporting, or turning off unused functions.

3. The method of claim 1, further comprises:

storing, at the server, a battery usage profile of the electronic device, the battery usage profile including information of at least one of battery capacity, battery temperature derating, or battery equivalent series resistance (ESR) profile.

4. The method of claim 3, wherein determining the remaining battery life includes determining the remaining battery life based on at least one of the received information from the electronic device, the battery usage profile, or the power management profile.

5. The method of claim 4, wherein determining the remaining battery life includes determining if the battery is at end of life by determining an ESR of the battery.

6. The method of claim 1, wherein the server stores a plurality of power management profiles, and wherein the power management profile and the updated power management profile are from the plurality of power management profiles stored at the server.

7. The method of claim 1, further comprising:

receiving navigation data from the electronic device;

based on the navigation data, determining if the electronic device is stationary or moving; and based on the determining, transmitting a further updated power management profile to the electronic device.

8. The method of claim 1, wherein the battery is at least one of a rechargeable battery or a non-rechargeable battery.

9. A server, comprising:

a memory; and at least one hardware processor communicatively coupled with the memory and configured to:

receive, from an electronic device, information for determining remaining battery life, wherein the information for determining remaining battery life comprises at least one of an unloaded battery voltage, a loaded battery voltage at a particular electric current value, or a temperature at the electronic device;

determine, based on at least one of the unloaded battery voltage, the loaded battery voltage at the particular electric current value, or the temperature at the electronic device, a remaining battery life of the electronic device, wherein the electronic device is powered by a battery and associated with a power management profile for managing power consumption at the electronic device, and the power management profile comprises a frequency for polling measurements from one or more sensors of the electronic device; and based on the determined remaining battery life, provision an updated power management profile for the electronic device, wherein the updated power management profile is transmitted from the server to the electronic device.

10. The server of claim 9, wherein the power management profile includes at least one of:

a wake-up frequency for a radio component of the electronic device to communicate with the server, and a time duration of each radio component wake-up;

a wake-up frequency for a navigation component of the electronic device to gather navigation data, and a time duration of each navigation wake-up;

or instructions to disable at least one application or one function on the electronic device;

wherein the electronic device, based on the power management profile, performs at least one of: scaling a voltage, a frequency, or a sleep duration of a processor of the electronic device, queuing sensor events, information store-and-forward, scaling a periodicity of event reporting, or turning off unused functions.

11. The server of claim 9, wherein the at least one hardware processor is further configured to:

store a battery usage profile of the electronic device, the battery usage profile including information of at least one of battery capacity, battery temperature derating, or battery equivalent series resistance (ESR) profile.

12. The server of claim 11, wherein determining the remaining battery life includes determining the remaining battery life based on at least one of the received information from the electronic device, the battery usage profile, or the power management profile, and determining the remaining battery life also includes determining if the battery is at end of life by determining an ESR of the battery.

13. A non-transitory computer-readable medium containing instructions which, when executed, cause a computing device to perform operations comprising:

receiving, at a server and from an electronic device, information for determining remaining battery life, wherein the information for determining remaining battery life comprises at least one of an unloaded battery voltage, a loaded battery voltage at a particular electric current value, or a temperature at the electronic device;

determining, by the server and based on at least one of the unloaded battery voltage, the loaded battery voltage at the particular electric current value, or the temperature at the electronic device, a remaining battery life of the electronic device, wherein the electronic device is powered by a battery and associated with a power management profile for managing power consumption at the electronic device, and the power management profile comprises a frequency for polling measurements from one or more sensors of the electronic device; and based on the determined remaining battery life, provisioning, at the server, an updated power management profile for the electronic device, wherein the updated power management profile is transmitted from the server to the electronic device.

14. The non-transitory computer-readable medium of claim 13, wherein the power management profile includes at least one of:

a wake-up frequency for a radio component of the electronic device to communicate with the server, and a time duration of each radio component wake-up;

a wake-up frequency for a navigation component of the electronic device to gather navigation data, and a time duration of each navigation wake-up;

or instructions to disable at least one application or one function on the electronic device;

wherein the electronic device, based on the power management profile, performs at least one of: scaling a voltage, a frequency, or a sleep duration of a processor of the electronic device, queuing sensor events, information store-and-forward, scaling a periodicity of event reporting, or turning off unused functions.

15. The non-transitory computer-readable medium of claim 13, wherein the operations further comprise:
storing a battery usage profile of the electronic device, the battery usage profile including information of at least one of battery capacity, battery temperature derating, or battery equivalent series resistance (ESR) profile.

16. The non-transitory computer-readable medium of claim 15, wherein determining the remaining battery life includes determining the remaining battery life based on at least one of the received information from the electronic device, the battery usage profile, or the power management profile, and determining the remaining battery life also includes determining if the battery is at end of life by determining an ESR of the battery.

* * * * *